United States Patent
Nespoux et al.

(10) Patent No.: US 10,028,616 B2
(45) Date of Patent: Jul. 24, 2018

(54) HOUSEHOLD APPLIANCE FOR FOOD PREPARATION, COMPRISING A WORKING CONTAINER WITH A BASKET FOR STEAM COOKING

(71) Applicant: SEB S.A., Ecully (FR)

(72) Inventors: Johan Nespoux, Laval (FR); Jean-Louis Deshayes, Averton (FR); Damien Maunoury, Chalons du Maine (FR)

(73) Assignee: SEB S.A., Ecully (FR)

( * ) Notice: Subject to any disclaimer, the term of this patent is extended or adjusted under 35 U.S.C. 154(b) by 303 days.

(21) Appl. No.: 14/649,024

(22) PCT Filed: Nov. 27, 2013

(86) PCT No.: PCT/FR2013/052880
§ 371 (c)(1),
(2) Date: Jun. 2, 2015

(87) PCT Pub. No.: WO2014/087077
PCT Pub. Date: Jun. 12, 2014

(65) Prior Publication Data
US 2015/0297027 A1    Oct. 22, 2015

(30) Foreign Application Priority Data

Dec. 3, 2012 (FR) ...................... 12 61567

(51) Int. Cl.
*A47J 37/01* (2006.01)
*A47J 36/16* (2006.01)
(Continued)

(52) U.S. Cl.
CPC ............. *A47J 37/01* (2013.01); *A47J 27/004* (2013.01); *A47J 36/165* (2013.01); *A47J 43/046* (2013.01)

(58) Field of Classification Search
CPC ........ A47J 37/01; A47J 27/004; A47J 43/046; A47J 36/165; A47J 36/20; A47J 27/04;
(Continued)

(56) References Cited

U.S. PATENT DOCUMENTS 3,892,365 A * 7/1975 Verdun .................. A47J 43/06
241/282.1
4,137,834 A    2/1979 Uibel
(Continued)

FOREIGN PATENT DOCUMENTS

| EP | 1922960 A1 | 5/2008 |
| FR | 2326171 | 4/1977 |
| GB | 2387768 A | 10/2003 |

*Primary Examiner* — David Angwin
*Assistant Examiner* — Biniam Asmelash
(74) *Attorney, Agent, or Firm* — The Webb Law Firm

(57) ABSTRACT

Provided is a household appliance for food preparation, comprising a working container having a bottom receiving a rotary tool that is rotatably driven by a motor and an open upper end via which ingredients can be inserted into the working container, a heating device for heating the contents of the working container, and a steam-cooking basket that lies in the working container, above the rotary tool, wherein said rotary tool can be removed from the working container and wherein said basket comprises a bottom having an opening for the passage of a body that grips the rotary tool when the basket is arranged in the working container.

13 Claims, 3 Drawing Sheets

(51) Int. Cl.
*A47J 43/046* (2006.01)
*A47J 27/00* (2006.01)

(58) Field of Classification Search
CPC ........ A47J 27/043; A47J 27/05; A47J 19/027; A23N 1/02
USPC ......... 99/510, 511, 512, 513, 410, 411, 413, 99/484
See application file for complete search history.

(56) References Cited

U.S. PATENT DOCUMENTS

| | | | | |
|---|---|---|---|---|
| 5,355,784 | A | * | 10/1994 | Franklin ............... A47J 19/027 241/199.12 |
| 6,076,452 | A | | 6/2000 | Beaba |
| 2007/0263482 | A1 | * | 11/2007 | Stephens ............... A47J 27/004 366/145 |
| 2010/0255168 | A1 | * | 10/2010 | Roth ....................... A47J 27/04 426/510 |
| 2011/0014342 | A1 | * | 1/2011 | Picozza ............... A47J 36/2433 426/474 |
| 2012/0213902 | A1 | * | 8/2012 | Leung .................... A47J 27/04 426/510 |

* cited by examiner

HOUSEHOLD APPLIANCE FOR FOOD PREPARATION, COMPRISING A WORKING CONTAINER WITH A BASKET FOR STEAM COOKING

CROSS-REFERENCE TO RELATED APPLICATIONS

This application is the United States national phase of International Application No. PCT/FR2013/052880 filed Nov. 27, 2013, and claims priority to French Patent Application No. 1261567 filed Dec. 3, 2012, the disclosures of which are hereby incorporated in their entirety by reference.

FIELD OF THE INVENTION

This invention falls in the general technical area of electrical appliances for food preparation comprising a working container with a bottom receiving a motor-powered rotary tool and a heating device to heat the contents of the working container and, more specifically, is an electrical appliance with a steam-cooking basket which rests within the working container above the rotary tool.

DESCRIPTION OF RELATED ART

Known art is patent filing FR 2 326 171, a food preparation device comprising a working container enclosing a tool which is rotatably driven by a motor where the working container is equipped with a resistance heating element on the bottom of the working container and a basket for steam cooking.

However, such a device is inconvenient in that it does not allow the user to easily clean the bottom of the container as the tool is attached to the bottom of the container and cannot be easily removed by the user. Such a device with a non-removable tool also has the inconvenience of not allowing the user to exchange the tool for another tool which is more suitable for the preparation of other types of dishes.

Also, one objective of this invention is to offer a household food preparation appliance that eliminates these inconveniences and that is ergonomic and simple and economical to manufacture.

SUMMARY OF THE INVENTION

To this end, the invention relates to a household food preparation appliance comprising a working container including a bottom receiving a motor-powered rotary tool and an open upper extremity through which ingredients may be added to the working container, a heating device designed to heat the contents of the working container, and a steam-cooking basket which rests within the working container above the rotary tool, characterized by the fact that the rotary tool can be removed from the working container and that the basket contains a bottom with an orifice which is traversed by a rotary tool gripping mechanism when the basket is inside in the working container.

"Removable tool" means a tool that may be removed from the bottom of the container through a simple action by the user without using a tool.

Such a characteristic has the advantage of allowing the rotary tool to be easily removed to be changed or cleaned by taking hold of the gripping mechanism, which has the advantage of extending toward the open upper extremity of the working container.

In accordance with another characteristic of the invention, the orifice contains a shutter, which is mobile or the shape of which can be changed, which may be in a rest position in which the shutter at least partially covers the basket orifice.

Such a shutter prevents food in the basket from falling through the orifice when the basket is removed from the working container.

In accordance with another characteristic of the invention, the shutter covers the entire basket orifice when in the rest position.

In accordance with another characteristic of the invention, the shutter automatically moves to the rest position when it is not pushed by the gripping mechanism.

In accordance with yet another characteristic of the invention, the shutter consists of a flexible membrane that includes slots through which the rotary tool gripping mechanism can pass as the flexible membrane deforms when the gripping mechanism moves through the slots.

In accordance with yet another characteristic of the invention, the shutter is made of elastomer.

In accordance with another characteristic of the invention, the orifice is located on the top of a funnel which projects from the bottom of the basket.

In accordance with another characteristic of the invention, the orifice is more than 2 cm wide.

In accordance with another characteristic of the invention, the orifice is positioned in the center of the basket.

In accordance with another characteristic of the invention, the rotary tool has at least one cutting blade.

Such a characteristic has the advantage of allowing preparation by mincing or mixing at the bottom of the working container.

In accordance with another characteristic of the invention, the working container contains a peripheral wall with nubs on which the basket rests when placed within the working container.

In accordance with another characteristic of the invention, the bottom of the basket contains several openings less than 2 mm in width.

In accordance with another characteristic of the invention, the gripping mechanism is formed by an upper section of a rotary tool hub where the hub extends up to more than half the height of the working container and preferably more than two-thirds of the height of the working container.

Such a characteristic allows easier gripping of the rotary tool, which has the advantage of extending significantly above the mixing volume of the container, so that it does not touch any liquid that may be on the bottom of the container and that the rotary tool is at a lower temperature.

BRIEF DESCRIPTION OF THE DRAWINGS

The purposes, aspects and advantages of this invention are easier to understand using the description provided below of a specific embodiment of the invention presented as a non-limitative example by referring to the attached drawings in which.

DETAILED DESCRIPTION OF THE INVENTION

Only the items necessary to understand the invention have been shown. To facilitate understanding of the drawings, the same items bear the same references in each figure.

Figure 1:
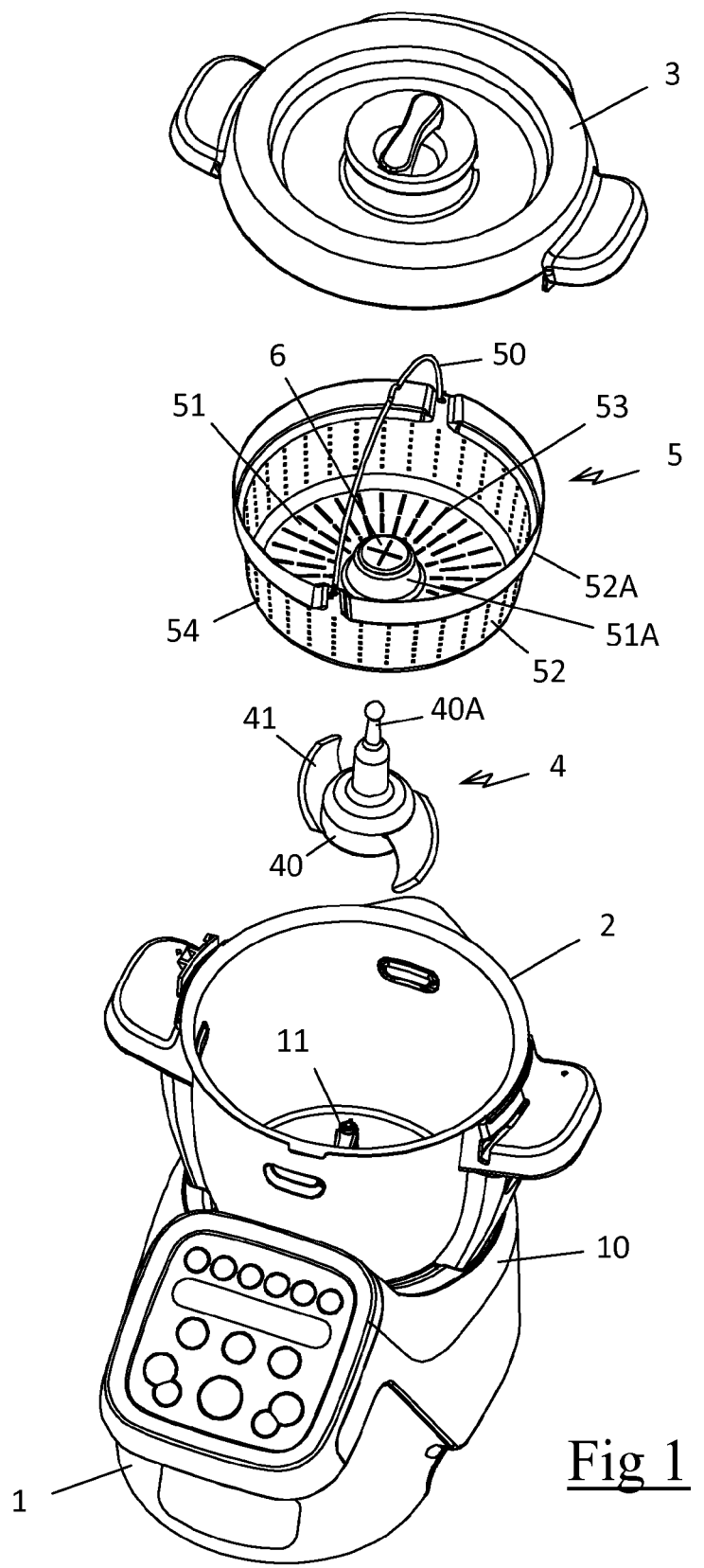
FIG. 1 is an exploded side view of a food preparation device in one specific embodiment of the invention.
Figure 2:
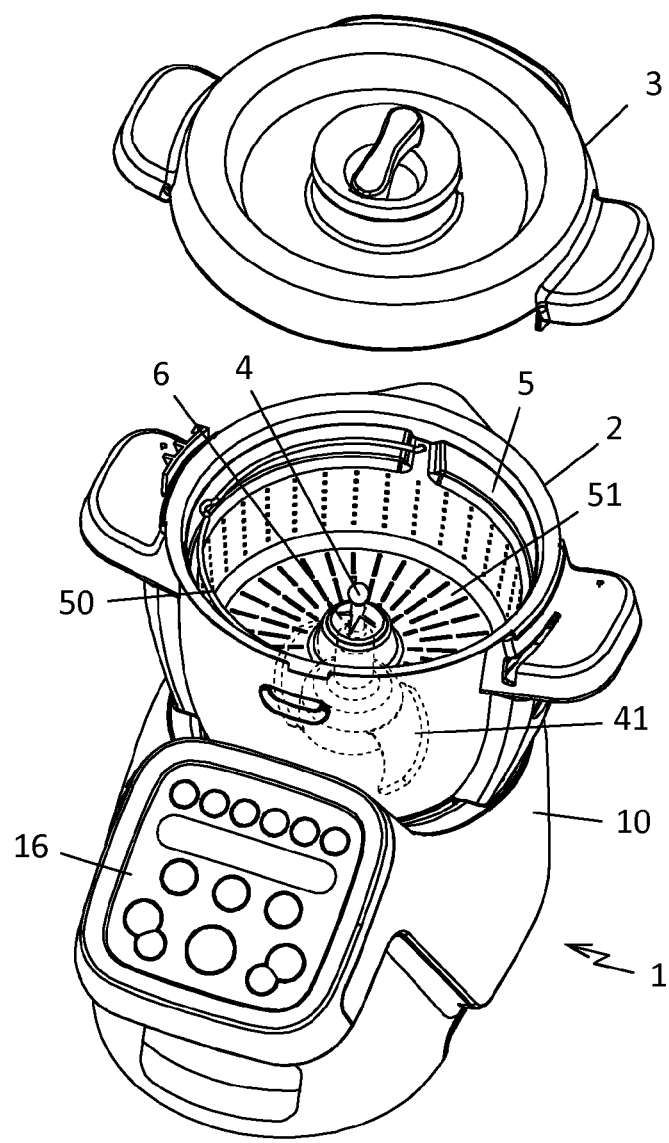
FIG. 2 is a view of the device in FIG. 1 where the working container is equipped with a rotary tool and basket with the cover shown in the open position.
Figure 3:
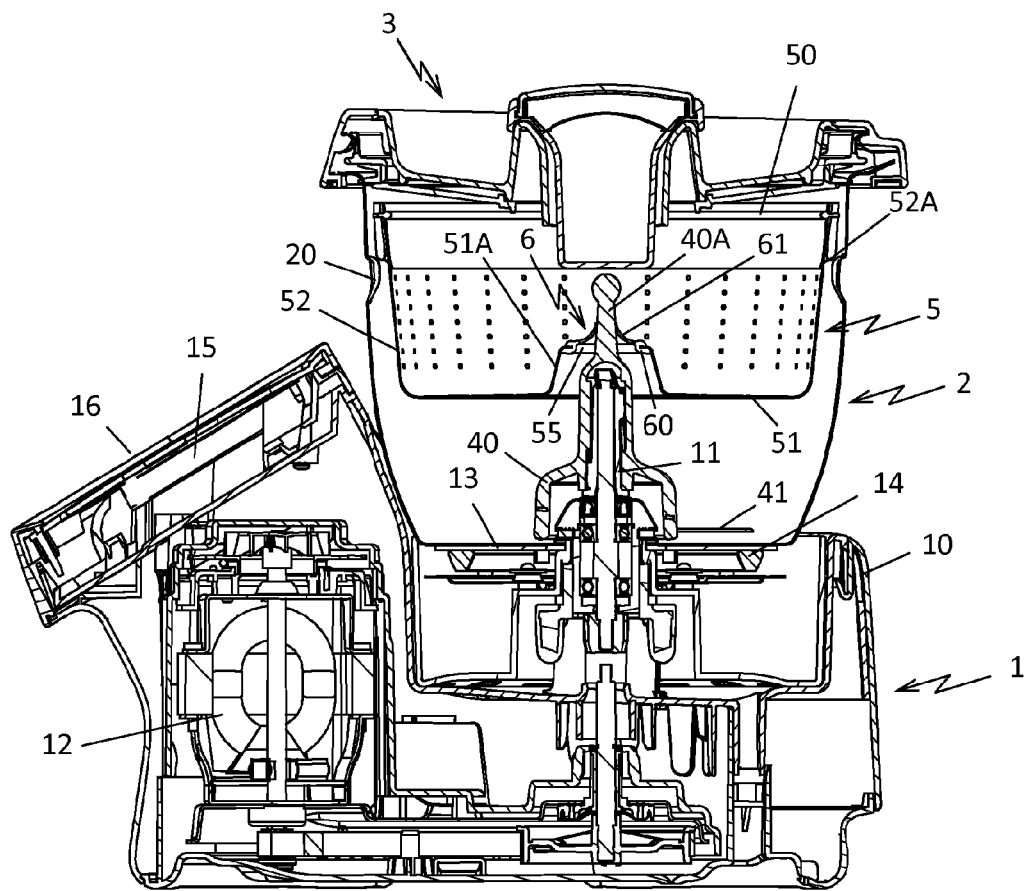
FIG. 3 is a longitudinal view of the device in FIG. 1 equipped with the rotary tool and basket with the cover in the closed position.

FIGS. 1 to 3 show a food preparation device containing housing 1 and removable working container 2 resting on base 10 of housing 1; working container 2 contains a cylindrical envelop approximately 15 cm in height and 20 cm in diameter, with an open upper extremity through which ingredients may be added to working container 2; this open upper extremity may be closed by removable cover 3.

Working container 2 is preferably made of stainless steel and includes a bottom which supports guide 11 connected by a kinematic chain to motor 12, visible only in FIG. 3, where base 10 is equipped with heating plate 13 with resistance element 14, a reinforced resistance element which heats the contents of working container 2.

Guide 11 allows cutting tool 4 with central hub 40 supporting two curved stainless steel blades 41, positioned 180° from one another, to chop food located at the bottom of working container 2, where hub 40 is covered in a plastic material and is connected in a removable manner to guide 11.

Resistance element 14 and motor 12 are controlled, in a known manner, by circuit board 15 located under control panel 16 on the forward face of housing 1; the temperature measured by a temperature probe is input to this circuit board which regulates the current to resistance element 14 to keep the contents of working container 2 at a recommended temperature.

The device also includes perforated basket 5, for steam cooking, which rests in, and can be removed from, working container 2 above cutting tool 4; basket 5 is approximately 8 cm in height and has pivoting prehensile handle 50 which can be in a vertical position, shown in FIG. 1, in which handle 50 extends above basket 5, and a folded position, shown in FIGS. 2 and 3, in which handle 50 is in a horizontal position inside basket 5.

Basket 5 includes bottom 51 and peripheral wall 52 with multiple openings 53 and 54 to allow steam passage; these openings are sized to ensure that the solid ingredients in basket 5 remain within basket 5 and do not pass through openings 53 and 54. For example, the openings in the bottom of basket 5 consist of slots 53 that extend radially within the basket and are less than 2 mm in width; the openings in the peripheral wall of basket 5 consist of circulars holes 54 with a diameter of less than 2 mm.

In accordance with FIG. 3, peripheral wall 52 of the basket contains shoulder 52A which rests on nubs 20 on the internal surface of the cylindrical envelop of working container 2; the nubs 20 ensure that basket 5 remains a fixed distance, approximately 6 cm, from the bottom of working container 2 to create a mixing volume of just under 2 liters beneath the basket.

In accordance with FIGS. 2 and 3, bottom 51 of the basket contains central truncated funnel 51A, approximately 2 cm in height, which attaches around hub 40 of cutting tool 4 when the basket is inside working container 2, and the upper section of the cutting hub tool contains gripping mechanism 40A, formed by a stem with an expanded extremity that extends axially to the upper opening of working container 2 and covers orifice 55, approximately 3 cm diameter, mounted at the top of funnel 51A.

Preferably, hub 40 of cutting tool 4 extends more than half the height of working container 2, and preferably over more than two-thirds of the height of working container 2, so that the upper extremity of gripping mechanism 40A generally extends past the upper half of working container 2 when cutting tool 4 is positioned on the bottom of working container 2.

In accordance with FIG. 1, orifice 55 of basket 5 is preferably equipped with shutter 6 which covers orifice 55 when it is not covered by the upper section of hub 40; shutter 6 prevents the food located in basket 5 from falling through orifice 55 when the user removes basket 5 from working container 2. In the specific embodiment shown, this shutter consists of silicone membrane 6 with peripheral bead 60 attached to the edge of orifice 55 that contains central section 61 with four slots extending 90° from one another allowing gripping mechanism 40A to pass through by elastic deformation of central section 61 of membrane 6.

The operation of the device will now be described.

When the user would like prepare a soup with solid chunks, he places cutting tool 4 on guide 11 and pours the liquid and solid ingredients to be mixed into the bottom of working container 2. He then places basket 5 in the working container so that the basket rests on the nubs, as shown in FIGS. 2 and 3; the upper extremity of gripping mechanism 40A then penetrates basket 5 through orifice 55 by pushing against the soft portions of central section 61 of membrane 6.

The user next places the solid ingredients which should be cooked without being mixed into basket 5, then pushes a button on control panel 16 of the device to start an automatic cooking program integrated into circuit board 15. The control program then supplies electricity to resistance element 14 to complete an initial cooking phase, then directs motor 12 to rotate cutting tool 4 and chop the cooked food located in the lower half of working container 2.

When the program has completed, the user may remove basket 5 from working container 2 by lifting it using handle 50; membrane 6 then automatically assumes a rest position, shown in FIG. 1, in which it cover orifice 55 and prevents the food in the basket from falling into this orifice 55.

The user may then remove cutting tool 4 to clean it by taking hold of gripping mechanism 40A which has the advantage of being located on the half upper of working container 2 so that it does not touch the liquid preparation, is easily accessible and is cooler. Therefore, the user may complete this operation easily and without risk of coming into contact with a hot section of working container 2, in particular a section of working container 2 located near heating plate 13.

Therefore, such a food preparation device has the advantage allowing chunky soups to be prepared automatically, so that the user only has to add the cooked food chunks using basket 5 to the smooth soup made by mixing in the lower section of working container 2.

Further, such a device also has the advantage of having removable cutting tool 4 which simplifies cleaning and allows the user to exchange cutting tool 4 for an appropriate tool for the desired cooking; cutting tool 4 could, for example, be replaced by an emulsifying tool to make sauces.

Finally, the device also has the advantage working without cutting tool 4 to, e.g., cook food without mixing; removing cutting tool 4 optimizes container and steam basket volume.

Of course, the invention is not in any manner limited to the embodiment described and illustrated, which is only provided as an example. Other modifications are possible by, in particular, combining various items or substituting equivalent techniques, without, however, falling outside the scope of the invention.

Accordingly, in an embodiment not shown, the shutter may consist of a flap mounted to pivot on the edge of the basket which is removed when pushed by the gripping mechanism when the basket is inserted into the working container; the flap is moved automatically, by gravity or using a recall spring, to a rest position in which it covers the orifice when the hub gripping mechanism is removed from the orifice.

The invention claimed is:

1. A household food preparation appliance comprising a working container, including a bottom which holds a rotary tool, which is rotatably driven by a motor and an open upper extremity through which ingredients may be added to the working container, a heating device designed to heat the contents of the working container, and a basket for steam cooking the contents of the working container above the rotary tool, wherein said rotary tool can be removed from the working container and wherein said basket contains a bottom with an orifice which is covered by a gripping mechanism of the rotary tool when the basket is located inside in the working container, wherein said orifice contains a shutter, which is mobile or the shape of which can be changed, that can be in a rest position in which said shutter at least partially covers the orifice in the bottom of the basket, and wherein the shutter is positioned inside the basket at least partially covering the orifice in the bottom of the basket such that the shutter is positioned below a top opening of the basket and surrounded by peripheral walls of the basket.

2. A household food preparation appliance in accordance with claim 1, wherein the shutter covers almost the entire orifice of the basket when it is the rest position.

3. A household food preparation appliance in accordance with claim 1, wherein said shutter is automatically moved into the rest position when it is not pushed by the gripping mechanism.

4. A household food preparation appliance in accordance with claim 1, wherein the shutter consists of a flexible membrane which includes slots for the passage of the gripping mechanism of the rotary tool where said flexible membrane changes shape when the gripping mechanism moves through the slots.

5. A household food preparation appliance in accordance with claim 1, wherein said shutter is made of elastomer.

6. A household food preparation appliance in accordance with claim 1, wherein said orifice is located at a top of a funnel which projects from the bottom of the basket.

7. A household food preparation appliance in accordance with claim 1, wherein the orifice has a width which exceeds 2 cm.

8. A household food preparation appliance in accordance with claim 1, wherein the orifice is located in the center of the basket.

9. A household food preparation appliance in accordance with claim 1, wherein the rotary tool has at least one cutting blade.

10. A household food preparation appliance in accordance with claim 1, wherein the working container has a peripheral wall with nubs on which the basket rests when it is placed within working container.

11. A household food preparation appliance in accordance with claim 1, wherein the bottom of the basket has multiple openings less than 2 mm in width.

12. A household food preparation appliance in accordance with claim 1, wherein the gripping mechanism is formed by an upper section of a hub of the rotary tool, where said hub extends up to more than half a height of the working container.

13. A household food preparation appliance in accordance with claim 1, wherein the gripping mechanism is formed by an upper section of a hub of the rotary tool, where said hub extends up to more than two-thirds of a height of the working container.

* * * * *